United States Patent
Zheng (10) Patent No.: US 12,373,957 B2
(45) Date of Patent: Jul. 29, 2025

(54) IMAGE SEGMENTATION METHOD, NETWORK TRAINING METHOD, ELECTRONIC EQUIPMENT AND STORAGE MEDIUM

(71) Applicant: ZHEJIANG DAHUA TECHNOLOGY CO., LTD., Hangzhou (CN)

(72) Inventor: Youxian Zheng, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 342 days.

(21) Appl. No.: 18/139,941

(22) Filed: Apr. 26, 2023

(65) Prior Publication Data
US 2024/0078680 A1  Mar. 7, 2024

Related U.S. Application Data

(63) Continuation of application No. PCT/CN2021/139223, filed on Dec. 17, 2021.

(30) Foreign Application Priority Data

Dec. 18, 2020 (CN) .......................... 202011511498.X (51) Int. Cl.
*G06T 7/00* (2017.01)
*G06T 7/11* (2017.01)
(Continued)

(52) U.S. Cl.
CPC .................. *G06T 7/12* (2017.01); *G06T 7/11* (2017.01); *G06T 7/194* (2017.01); *G06V 10/25* (2022.01);
(Continued)

(58) Field of Classification Search
CPC .. G06T 7/12; G06T 7/11; G06T 7/194; G06V 10/25; G06V 10/44; G06V 10/764;
(Continued)

(56) References Cited

U.S. PATENT DOCUMENTS

| 11,238,596 | B1* | 2/2022 | Gadde | .................. G06V 30/274 |
| 2018/0108137 | A1* | 4/2018 | Price | ...................... G06N 3/045 |

(Continued)

FOREIGN PATENT DOCUMENTS

| CN | 110246141 A | 9/2019 |
| CN | 110532954 A | 12/2019 |

(Continued)

OTHER PUBLICATIONS

Kaiming He et al., «Mask R-CNN», 2018.
(Continued)

*Primary Examiner* — Van D Huynh (57) ABSTRACT

Disclosed are an image segmentation method, a training method for an image segmentation network, an electronic equipment, and a storage medium. The method includes: sending an input image to an image segmentation network; obtaining a first foreground target box of the input image; obtaining a first region of interest and a first region-of-interest feature map of the input image based on the first foreground target box; dividing the first region of interest into grids, predicting a corresponding feature of each grid in the first region of interest based on the first region-of-interest feature map, obtaining a semantic feature of each pixel in the first region of interest; and obtaining an instance segmentation result based on the corresponding feature of each grid in the first region of interest, information of the first foreground target box, and the semantic feature of each pixel in the first region of interest.

20 Claims, 4 Drawing Sheets

(51) Int. Cl.
   *G06T 7/12* (2017.01)
   *G06T 7/194* (2017.01)
   *G06V 10/25* (2022.01)
   *G06V 10/44* (2022.01)
   *G06V 10/764* (2022.01)
   *G06V 10/771* (2022.01)

(52) U.S. Cl.
   CPC ............ *G06V 10/44* (2022.01); *G06V 10/764* (2022.01); *G06V 10/771* (2022.01)

(58) Field of Classification Search
   CPC ...... G06V 10/771; G06V 10/82; G06V 20/70; G06V 10/267; G06V 2201/07; G06N 3/045; G06N 3/08; G06F 18/2415
   See application file for complete search history.

(56) References Cited

U.S. PATENT DOCUMENTS

| | | | |
|---|---|---|---|
| 2019/0057507 A1* | 2/2019 | El-Khamy | G06T 11/60 |
| 2020/0005453 A1 | 1/2020 | Lin et al. | |
| 2020/0082219 A1* | 3/2020 | Li | G01S 7/417 |
| 2021/0056708 A1* | 2/2021 | Li | G06T 7/11 |
| 2021/0158043 A1* | 5/2021 | Hou | G06V 10/454 |
| 2021/0366127 A1* | 11/2021 | Gu | G06T 7/11 |
| 2022/0051045 A1* | 2/2022 | Vandersmissen | G06V 10/25 |
| 2022/0130141 A1* | 4/2022 | Wang | G06V 20/695 |
| 2022/0398742 A1* | 12/2022 | Zhang | G06V 10/776 |
| 2023/0186100 A1* | 6/2023 | Nugteren | G06F 18/24143 382/155 |
| 2023/0419648 A1* | 12/2023 | Ghafoorian | G06V 10/82 |

FOREIGN PATENT DOCUMENTS

| | | |
|---|---|---|
| CN | 110599500 A | 12/2019 |
| CN | 111192277 A | 5/2020 |
| CN | 112613519 A | 4/2021 |
| EP | 3663982 A1 | 6/2020 |

OTHER PUBLICATIONS

Xinlong Wang et al., «Solo : Segmenting Objects by Locations», 2020.
International Search Report, International Application No. PCT/CN2021/139223, mailed Mar. 16, 2022 (9 pages).
Zhang Xiangyi et al: "Mask R-CNN with Feature Pyramid Attention for Instance Segmentation", 2018 14th IEEE International Conference on Signal Processing (ICSP), IEEE, Aug. 12, 2018 (Aug. 12, 2018), pp. 1194-1197, XP033524372, DOI: 10.1109/ICSP.2018. 8652371 [retrieved on Feb. 25, 2019].
He Kaiming et al: "Mask R-CNN", IEEE Transactions on Pattern Analysis and Machine Intelligence, IEEE Computer Society, USA, vol. 42, No. 2,Jun. 5, 2018 (Jun. 5, 2018), pp. 386-397, XP011765746,ISSN: 0162-8828, DOI: 10.1109/TPAMI.2018. 2844175 [retrieved on Jan. 7, 2020].
Lu Xin et al: "Grid R-CNN", 2019 IEEE/CVF Conference On Computer Vision and Pattern Recognition (CVPR), IEEE, Jun. 15, 2019 (Jun. 15, 2019), pp. 7355-7364, XP033686690, DOI: 10.1109/ CVPR.2019.00754 [retrieved on Jan. 8, 2020].
European Search Report, European Application No. 21905836.9, mailed Feb. 13, 2024 (9 pages).
Chinese First Office Action, Chinese Application No. 202011511498. X, mailed Jun. 1, 2023 (9 pages).

* cited by examiner

IMAGE SEGMENTATION METHOD, NETWORK TRAINING METHOD, ELECTRONIC EQUIPMENT AND STORAGE MEDIUM

CROSS REFERENCE

The present application claims foreign priority of China Patent Application No. 202011511498.X filed on Dec. 18, 2020, in the China National Intellectual Property Administration, the entire contents of which are hereby incorporated by reference.

TECHNICAL FIELD

The present disclosure relates to the field of image segmentation technologies, and in particular to an image segmentation method, a training method for an image segmentation network, an electronic equipment, and a storage medium.

BACKGROUND

Image segmentation refers to pixel-level classification of an image to segment object regions (such as a car, a person, a tree, sky, etc.) in the image to achieve subsequent processing of a target region. The method for image segmentation can be divided into semantic segmentation, instance segmentation, panoptic segmentation, etc. Through the semantic segmentation, specific categories of all pixels in the image (such as cars, persons, trees, sky, etc.) can be obtained. Through the instance segmentation, specific categories of each target pixel in the image (such as a car, a person, etc.) may be obtained, while different targets in the same category can be segmented. Through the panoptic segmentation combined with the semantic segmentation and instance segmentation, instance segmentation on focus objects (such as a car, a person, etc.) can be performed, and semantic segmentation on non-focus objects (such as trees, sky, etc.) can be performed to achieve full-map segmentation.

However, the existing instance segmentation methods are time-consuming and requires a large amount of memory. Moreover, the granularity of the segmentation cannot reach the semantic level.

SUMMARY OF THE DISCLOSURE

The present disclosure provides an image segmentation method, a training method for an image segmentation network, an electronic equipment, and a storage medium, to address problems for the existing instance segmentation methods with poor granularity of the segmentation, time-consuming and requiring a large amount of memory.

To address the above technical problem, a technical solution adopted by the present disclosure is to provide an image segmentation method, comprising: sending an input image to an image segmentation network; obtaining a first foreground target box of the input image by the image segmentation network; obtaining a first region of interest and a first region-of-interest feature map of the input image based on the first foreground target box by the image segmentation network; wherein the first region of interest is a region corresponding to the first foreground target box of the input image; dividing the first region of interest into a plurality of grids by the image segmentation network, predicting a corresponding feature of each grid in the first region of interest based on the first region-of-interest feature map by the image segmentation network, and obtaining a semantic feature of each pixel in the first region of interest by the image segmentation network; wherein the corresponding feature of each grid is the probability of an existence of a foreground target in the each grid; and obtaining an instance segmentation result based on the corresponding feature of each grid in the first region of interest, information of the first foreground target box, and the semantic feature of each pixel in the first region of interest.

To address the above technical problem, another technical solution adopted by the present disclosure is to provide a training method for an image segmentation network, comprising: sending a training image to the image segmentation network; obtaining a second basic feature map of the training image by the image segmentation network; obtaining a second region of interest and a third region-of-interest feature map in the training image based on the second basic feature map by the image segmentation network; dividing the second region of interest into a plurality of grids by the image segmentation network, predicting a corresponding feature of each grid in the second region of interest based on the second region-of-interest feature map by the image segmentation network, and obtaining a second semantic segmentation feature map by performing semantic segmentation for the second basic feature map by the image segmentation network; obtaining a first loss of the image segmentation network based on a difference between the corresponding feature of each grid in the second region of interest and a first ground truth, and obtaining a second loss of the image segmentation network based on a difference between the second semantic segmentation feature map and a second ground truth; and adjusting weights of the image segmentation network based on the first loss and the second loss.

To address the above technical problem, another technical solution adopted by the present disclosure is to provide an electronic device, comprising a processor and a memory connected to the processor; wherein the memory stores a program instruction; the processor is configured to perform the above methods by executing the program instruction stored in the memory.

To address the above technical problem, another technical solution adopted by the present disclosure is to provide a storage medium, storing a program instruction; wherein the program instruction is executable to perform the above methods.

Through the above disclosure, the present disclosure obtains the first foreground target box of the input image by the image segmentation network, obtains the first basic feature map and the first region-of-interest feature map of the input image based on the first foreground target box, and performs a grid-based target locating on the first region of interest, thereby fast achieving a coarse locating of the foreground target in the first region of interest; the present disclosure obtains the semantic feature of each pixel in the first region of interest by the image segmentation network, such that the instance segmentation result can be obtained by combining the coarse locating result of the foreground target in the first region of interest and the semantic feature of each pixel. Compared with Mask R-CNN using a segmentation branch to perform instance segmentation on the feature map of the first region of interest, the granularity of segmentation is improved.

Moreover, since the segmentation branch of Mask R-CNN is required to obtain the probabilities that each feature point in the first region-of-interest feature map belongs to each category, the size of the output feature map is C (number of categories)×H (height of region-of-interest feature map)×W (width of region-of-interest feature map). While the image segmentation network in the present disclosure only predicts whether a target exists in each grid, and reduces the output size to $1 \times S^2$, thus reducing the amount of memory and time required for image segmentation.

DETAILED DESCRIPTION

The technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments. Based on the embodiments in the present disclosure, all other embodiments obtained by those skilled in the art without creative work shall fall within the scope of the present disclosure.

The terms "first", "second", and "third" in the present disclosure are only for descriptive purposes, and cannot be understood as indicating or implying relative importance or implicitly indicating the number of indicated technical features. Thus, the features defined with "first", "second", and "third" may explicitly or implicitly include at least one of the features. In the description of the present disclosure, "a plurality of" means at least two, such as two, three, etc., unless specifically defined otherwise.

The terms "embodiments" herein means that a specific feature, structure, or characteristic described in conjunction with the embodiments may be included in at least one embodiment of the present disclosure. The appearance of the terms in various places in the specification does not necessarily refer to a same embodiment, nor to an independent or alternative embodiment mutually exclusive with other embodiments. Those skilled in the art clearly and implicitly understand that the embodiments described herein can be combined with other embodiments if there is no conflict.

Figure 1:
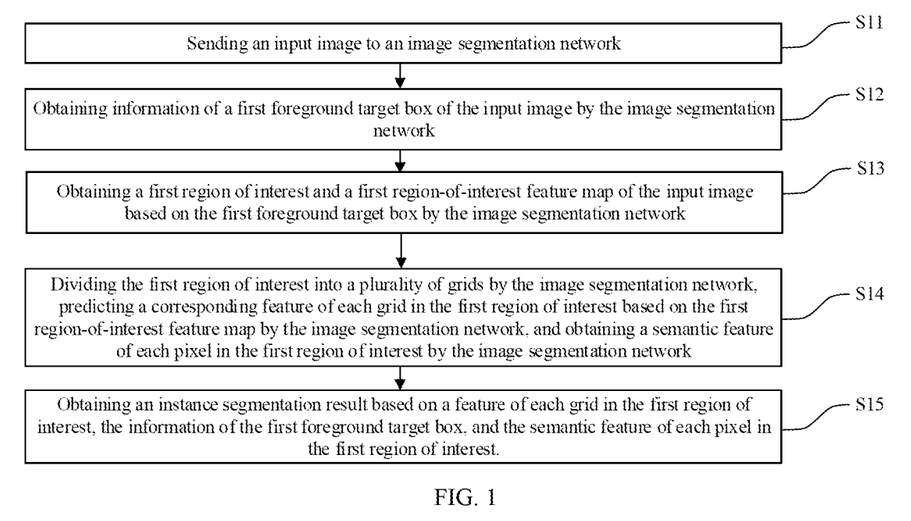
FIG. 1 is a flowchart of an image segmentation method according to an embodiment of the present disclosure.

FIG. 1 is a flowchart of an image segmentation method according to an embodiment of the present disclosure. It should be noted that if there are substantially same results, the embodiment is not limited to the sequence of the process shown in FIG. 1. The method may include operations illustrated at blocks as shown in FIG. 1.

At block S11: sending an input image to an image segmentation network.

Figure 2:
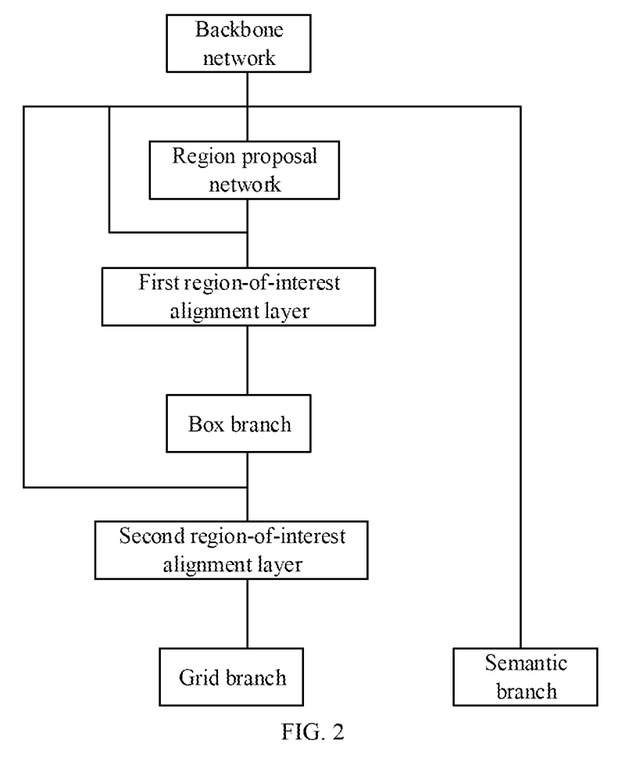
FIG. 2 is a schematic view of an architecture of an image segmentation network according to an embodiment of the present disclosure.

The method provided in the present disclosure will be described with reference to the image segmentation network architecture shown in FIG. 2. As shown in FIG. 2, the image segmentation network may include a backbone network, a region proposal network, a first region-of-interest alignment layer, a box branch, a second region-of-interest alignment layer, a grid branch, and a semantic branch.

The backbone network may be a CNN network such as ResNet with FPN, VGG, etc. The backbone network may include a spatial attention module and a channel attention module. The backbone network may be configured to perform shallow and deep feature extraction on an image. The region proposal network may be configured to generate a candidate box for a foreground object. The box branch may be composed of a convolutional layer and a fill convolutional layer. The grid branch may be composed of a convolutional layer and a full convolutional layer, or may be composed of convolution and a two-dimensional adaptive pooling layer. The semantic branch may be composed of a convolutional layer, a deconvolutional layer, and an element-wise operation layer, and may also include a multi-resolution feature map fusion operation.

Compared with Mask R-CNN, a segmentation branch is omitted in the image segmentation network, while the grid branch and semantic branch are included. That is, the image segmentation network realizes segmentation through the grid branch and semantic branch.

At block S12: obtaining information of a first foreground target box of the input image by the image segmentation network.

The information of the first foreground target box may include the location and the category of the first foreground target box. The category of the foreground target box may be a car, a person, etc.

Figure 3:
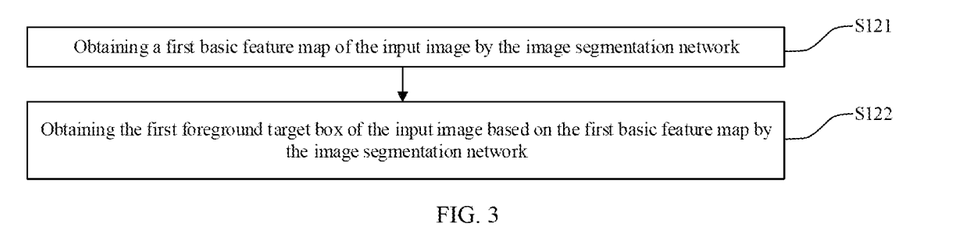
FIG. 3 is a flowchart of specific operations of S12 shown in FIG. 1.

Referring to FIG. 3, the operation S12 may include the following sub-operations.

At block S121: obtaining a first basic feature map of the input image by the image segmentation network.

The input image reaches the backbone network, and the backbone network may perform shallow and deep feature extraction on the input image to obtain the first basic feature map of the input image.

At block S122: obtaining the first foreground target box of the input image based on the first basic feature map by the image segmentation network.

Figure 4:
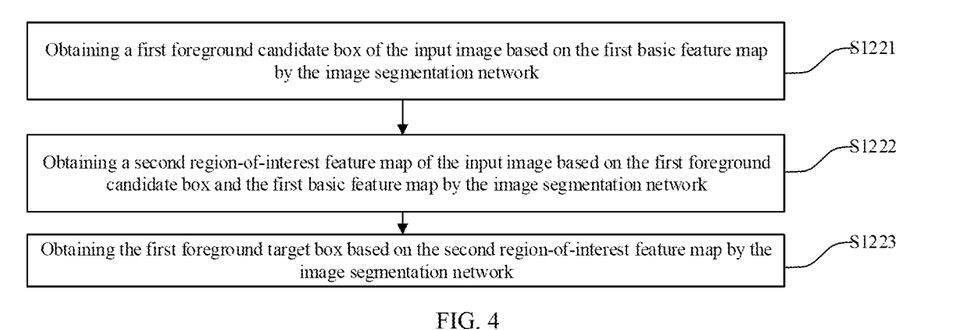
FIG. 4 is a flowchart of specific operations of S122 shown in FIG. 3.

Referring to FIG. 4, the operation S122 may include the following sub-operations.

At block S1221: obtaining a first foreground candidate box of the input image based on the first basic feature map by the image segmentation network.

The first basic feature map reaches the region proposal network, and the region proposal network may generate a large number of first target candidate boxes (i.e., regional boxes in which targets may exist in the first basic feature map/input image). The first target candidate box may include a first foreground candidate box and a first background candidate box. The foreground candidate box may be a region that may include a foreground object. Thresholding and non-maximum suppression processing may be performed on the first target candidate box to obtain the first foreground candidate boxes in the first target candidate box. To simplify the description, the present disclosure will be described by taking one of the multiple first foreground candidate boxes as an example.

At block S1222: obtaining a second region-of-interest feature map of the input image based on the first foreground candidate box and the first basic feature map by the image segmentation network.

The second region-of-interest feature map may be a feature map corresponding to the first foreground candidate box in the first basic feature map.

The first foreground candidate box and the first basic feature map reach the first region-of-interest alignment (RoIAlign) layer, and the second region-of-interest feature map may be obtained. The size of the second region-of-interest feature map may be 7×7, 14×14, etc.

At block S1223: obtaining the first foreground target box based on the second region-of-interest feature map by the image segmentation network.

Figure 5:
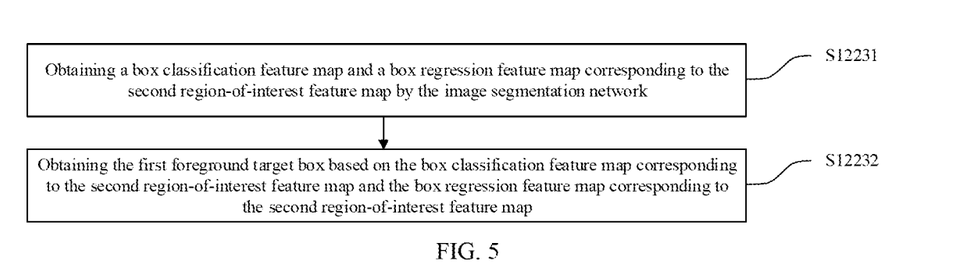
FIG. 5 is a flowchart of specific operations of S1223 shown in FIG. 4.

Referring to FIG. 5, the operation S1223 may include the following sub-operations.

At block S12231: obtaining a box classification feature map and a box regression feature map corresponding to the second region-of-interest feature map by the image segmentation network.

The box classification feature map may be configured to indicate the probabilities that the first foreground candidate box belongs to each category, and the first box regression feature map may be configured to indicate the offset of the first foreground target box relative to the first foreground candidate box.

At block S12232: obtaining the first foreground target box based on the box classification feature map corresponding to the second region-of-interest feature map and the box regression feature map corresponding to the second region-of-interest feature map.

The second region-of-interest feature map reaches the box branch, and the box branch may obtain the box classification feature map and the box regression feature map corresponding to the second region-of-interest feature map. The dimension of the box classification feature map may be equal to the number of regions of interest×the number of foreground target categories. Each dimension feature in the box classification feature map may be the probabilities that the corresponding region of interest belongs to each category. The dimension of the box regression feature map may be equal to 4 times the number of target categories. Each dimension feature in the box regression feature map may represent the location offset when the foreground target box in the corresponding first region of interest belongs to each category.

After obtaining the box classification feature map and the box regression feature map corresponding to the second region-of-interest feature map, post processing of the boxes may be performed to obtain the information of the first foreground target box.

The box classification feature map corresponding to the second region-of-interest feature map may be performed with threshold filtering processing to obtain the category of the first foreground target box. The box regression feature map corresponding to the second region-of-interest feature map may be performed with offset transformation with the location of the first foreground candidate box to obtain the location of the first foreground target box. The location of a box can be represented by coordinates of an upper left corner and coordinates of a lower right corner of the box, or can be represented by coordinates of the upper left corner, width and height of the box.

In a case that there are multiple first foreground target boxes, non-maximum suppression processing may be performed on each first foreground target box based on the information of each first foreground target box, thereby selecting a final one from the each first foreground target boxes. To simplify the description, one of the final first foreground target boxes is taken for description in the following.

At block S13: obtaining a first region of interest and a first region-of-interest feature map of the input image based on the first foreground target box by the image segmentation network.

The first foreground target box and the first basic feature map reach the second region-of-interest alignment layer, and a feature map corresponding to the first foreground target box in the first basic feature map, that is, the first region-of-interest feature map, may be obtained. The first region of interest is a region corresponding to the first foreground target box of the input image.

At block S14: dividing the first region of interest into a plurality of grids by the image segmentation network, predicting a corresponding feature of each grid in the first region of interest based on the first region-of-interest feature map by the image segmentation network, and obtaining a semantic feature of each pixel in the first region of interest by the image segmentation network.

The feature of the grid is the probability of the existence of a target in the grid. Each grid may include one pixel or multiple pixels.

The first region of interest and the first region-of-interest feature map reach the box branch, and the box branch may divide the first region of interest into S×S grids. The value of S may be 14, 28, etc. The box branch may predict the probability of a foreground object in each grid of the first region of interest based on the first region-of-interest feature map. When the probability of the existence of the foreground target is greater than a preset probability threshold, it means that a foreground target exists in the current grid. When the probability of the existence of the foreground target is less than or equal to the preset probability threshold, it means that no foreground targets exist in the current grid.

Figure 6:
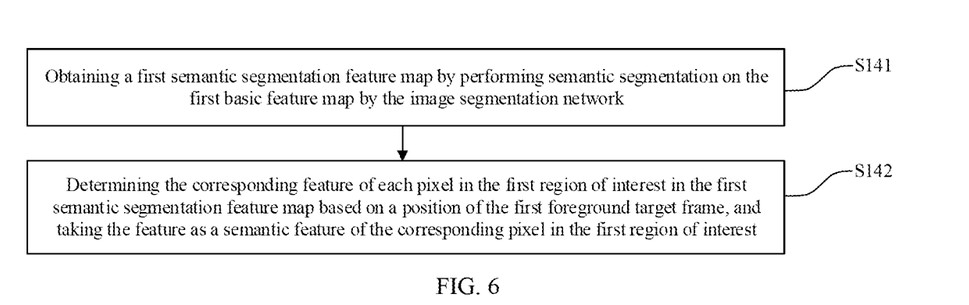
FIG. 6 is a flowchart of specific operations of S14 shown in FIG. 1.

Referring to FIG. 6, in the operation S14, the obtaining semantic feature of each pixel in the first region of interest by the image segmentation network may include the following sub-operations.

At block S141: obtaining a first semantic segmentation feature map by performing semantic segmentation on the first basic feature map by the image segmentation network.

The first basic feature map reaches the semantic branch, and the semantic branch may perform semantic segmentation on the first basic feature map to obtain the first semantic segmentation feature map. The semantic segmentation refers to predicting the probabilities that each feature point in the first basic feature map belongs to each category. For each feature point, the category corresponding to the maximum probability is taken as a label of the feature point, that is, a category ID of the category is taken as a semantic segmentation result. For example, for a feature point A, the probability of belonging to cars is 0.8, and the probability of belonging to persons is 0.2, then "car" is used as the corresponding label, that is, the semantic category ID corresponding to the car is taken as the semantic segmentation result of the feature point A.

At block S142: determining the corresponding feature of each pixel in the first region of interest in the first semantic segmentation feature map based on a location of the first foreground target box, and taking the feature as a semantic feature of the corresponding pixel in the first region of interest.

At block S15: obtaining an instance segmentation result based on a corresponding feature of each grid in the first region of interest, the information of the first foreground target box, and the semantic feature of each pixel in the first region of interest.

The instance segmentation result may include the category and corresponding pixels of the foreground target of the input image.

Figure 7:
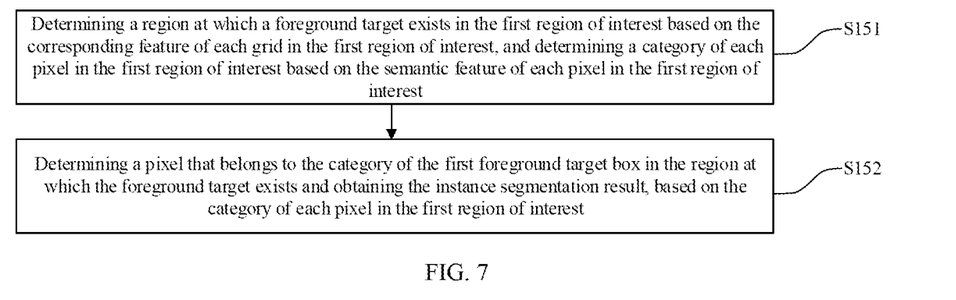
FIG. 7 is a flowchart of specific operations of S15 shown in FIG. 1.

Referring to FIG. 7, the operation S15 may include the following sub-operations.

At block S151: determining a region at which a foreground target exists in the first region of interest based on the corresponding feature of each grid in the first region of interest, and determining a category of each pixel in the first region of interest based on the semantic feature of each pixel in the first region of interest.

The corresponding feature of the grid corresponding to the region at which the foreground target exists is greater than the preset probability threshold.

At block S152: determining a pixel that belongs to the category of the first foreground target box in the region at which the foreground target exists and obtaining the instance segmentation result, based on the category of each pixel in the first region of interest and the region at which the foreground target exists.

The category of the first foreground target box may be taken as the category of the foreground target existing in the first region of interest, and the pixel belonging to the category of the first foreground target box in the region at which the foreground target exists may be taken as a pixel of the foreground target in the first region of interest.

Through the implementation of the embodiments, the present disclosure obtains the first foreground target box of the input image by the image segmentation network, obtains the first basic feature map and the first region-of-interest feature map of the input image based on the first foreground target box, and performs a grid-based target locating on the first region of interest, thereby quickly achieving a coarse locating of the foreground target in the first region of interest; the present disclosure obtains the semantic feature of each pixel in the first region of interest by the image segmentation network, such that the instance segmentation result can be obtained by combining the coarse locating result of the foreground target in the first region of interest and the semantic feature of each pixel. Compared with Mask R-CNN using a segmentation branch to perform instance segmentation on the feature map of the first region of interest, the granularity of segmentation is improved.

Moreover, since the segmentation branch of Mask R-CNN is required to obtain the probabilities that each feature point in the first region-of-interest feature map belongs to each category, the size of the output feature map is C (number of categories)×H (height of region-of-interest feature map)×W (width of region-of-interest feature map). While the image segmentation network in the present disclosure only predicts whether a target exists in each grid, and reduces the output size to $1 \times S^2$, thus reducing the amount of memory and time required for image segmentation.

Before the image segmentation network is used in the above embodiments, the image segmentation network may be trained to improve the image segmentation effect of the image segmentation network. The details can be as follows.

Figure 8:
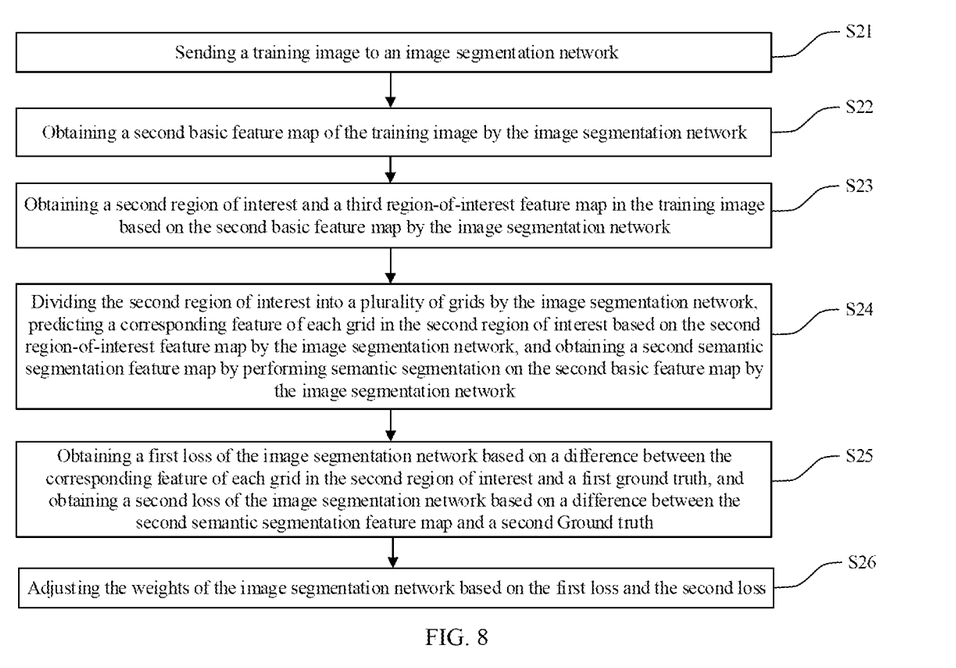
FIG. 8 is a flowchart of a training method for an image segmentation network according to an embodiment of the present disclosure.

FIG. 8 is a flowchart of a training method for an image segmentation network according to an embodiment of the present disclosure. It should be noted that if there are substantially same results, the embodiment is not limited to the sequence of the process shown in FIG. 8. The training method may include operations as followed.

At block S21: sending a training image to an image segmentation network.

The training images may have a ground truth label.

At block S22: obtaining a second basic feature map of the training image by the image segmentation network.

At block S23: obtaining a second region of interest and a third region-of-interest feature map in the training image based on the second basic feature map by the image segmentation network.

Figure 9:
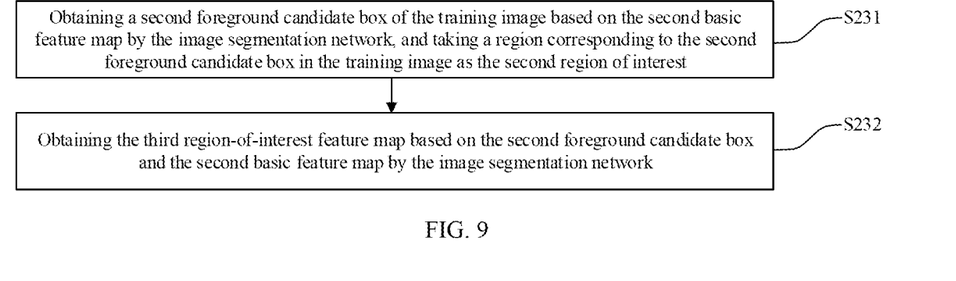
FIG. 9 is a flowchart of specific operations of S23 shown in FIG. 8.

Referring to FIG. 9, S23 may include the following sub-operations.

At block S231: obtaining a second foreground candidate box of the training image based on the second basic feature map by the image segmentation network, and taking a region corresponding to the second foreground candidate box in the training image as the second region of interest.

At block S232: obtaining the third region-of-interest feature map based on the second foreground candidate box and the second basic feature map by the image segmentation network.

The third region-of-interest feature map may be a feature map corresponding to the second foreground candidate box in the second basic feature map. It can be understood that, compared with the previous use phrase, the box classification feature map and box regression feature map corresponding to the region of interest during training are not reliable. Therefore, the new region-of-interest feature map is not obtained based on the box classification feature map and box regression feature map corresponding to the region of interest obtained in this step.

At block S24: dividing the second region of interest into a plurality of grids by the image segmentation network, predicting a corresponding feature of each grid in the second region of interest based on the second region-of-interest feature map by the image segmentation network, and obtaining a second semantic segmentation feature map by performing semantic segmentation on the second basic feature map by the image segmentation network.

The corresponding feature of a grid may be a predicted probability of the existence of the target in the grid, and the value range thereof is 0 to 1. A first ground truth may be an actual probability of the existence of the target in the grid, and the value thereof is 0 (target not existing) or 1 (target existing).

At block S25: obtaining a first loss of the image segmentation network based on a difference between the corresponding feature of each grid in the second region of interest and a first ground truth, and obtaining a second loss of the image segmentation network based on a difference between the second semantic segmentation feature map and a second ground truth.

Based on the difference between the corresponding feature of each grid and the first ground truth, the loss (for example, cross entropy loss) of the feature learning process corresponding to the grid can be obtained.

The second semantic segmentation feature map is configured to express the predicted probabilities that each feature point in the second basic feature map belongs to each category. Based on the difference between the second semantic segmentation feature map and the second ground truth, the loss (for example, Dice loss) of the semantic segmentation learning process can be obtained. The second ground truth may be an input image label map corresponding to a semantic feature resolution.

At block S26: adjusting weights of the image segmentation network based on the first loss and the second loss.

For other detailed descriptions in the embodiment, reference may be made to the previous embodiments, which will not be repeated here.

Figure 10:
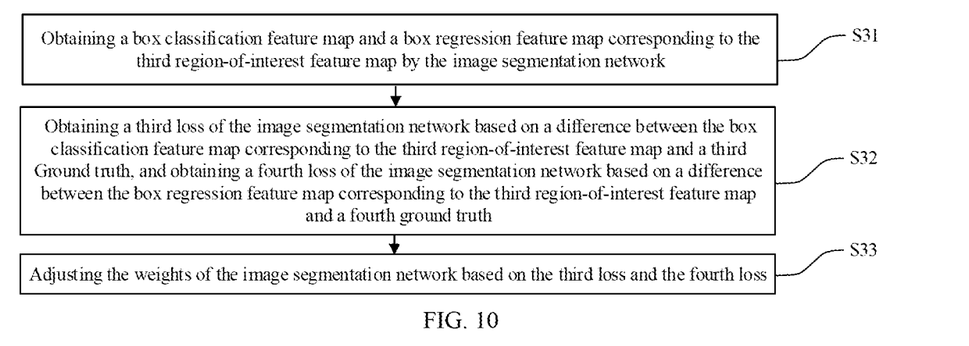
FIG. 10 is a flowchart of a training method for an image segmentation network according to another embodiment of the present disclosure.

FIG. 10 is a flowchart of a training method for an image segmentation network according to another embodiment of the present disclosure. It should be noted that if there are substantially same results, the embodiment is not limited to the sequence of the process shown in FIG. 10. This embodiment is a further extension of the above embodiment. As shown in FIG. 10, after the operation S232, the training method may further include operations as followed.

At block S31: obtaining a box classification feature map and a box regression feature map corresponding to the third region-of-interest feature map by the image segmentation network.

The box classification feature map corresponding to the third region-of-interest feature map may be configured to represent the probabilities that the second foreground candidate box belongs to each category, and the box regression feature map corresponding to the third region-of-interest feature map may be configured to represent the offset of a second foreground target box relative to the second foreground candidate box.

The second foreground target box may be a foreground target box corresponding to the second foreground candidate box.

At block S32: obtaining a third loss of the image segmentation network based on a difference between the box classification feature map corresponding to the third region-of-interest feature map and a third ground truth, and obtaining a fourth loss of the image segmentation network based on a difference between the box regression feature map corresponding to the third region-of-interest feature map and a fourth ground truth.

Based on the difference between the box classification feature map and the third ground truth, the loss (for example, cross entropy loss) of the box classification feature map learning process can be obtained. Based on the difference between the box regression feature map and the fourth ground truth, the loss (for example, CIoU loss) of the box regression feature map learning process can be obtained. The third ground truth may be a ground truth of the second foreground candidate box matching the category of the second foreground target box, and the fourth ground truth may be a ground truth of the second foreground candidate box matching the location of the second foreground target box and the offset of the second foreground candidate box location.

At block S33: adjusting the weights of the image segmentation network based on the third loss and the fourth loss.

For other detailed descriptions of the embodiment, reference may be made to the previous embodiments, which will not be repeated here.

Figure 11:
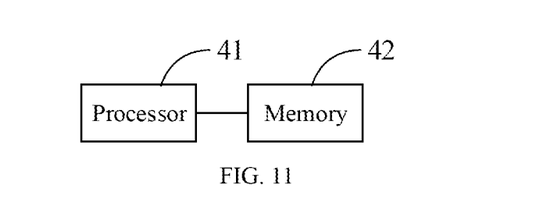
FIG. 11 is a structural schematic view of an electronic equipment according to an embodiment of the present disclosure.

FIG. 11 is a structural schematic view of an electronic equipment according to an embodiment of the present disclosure. As shown in FIG. 11, the electronic device includes a processor 41 and a memory 42 coupled to the processor 41.

The memory 42 stores program instructions for implementing the method of any of the foregoing embodiments; the processor 41 is configured to execute the program instructions stored in the memory 42 to implement the operations of the foregoing method embodiments. The processor 41 may also be referred to as a central processing unit (CPU). The processor 41 may be an integrated circuit chip with signal processing capabilities. The processor 41 may also be a general-purpose processor, a digital signal processor (DSP), an application specific integrated circuit (ASIC), a field programmable gate array (FPGA) or other programmable logic devices, a discrete gate or transistor logic device, a discrete hardware component. The general-purpose processor may be a microprocessor or the processor may also be any conventional processor or the like.

Figure 12:
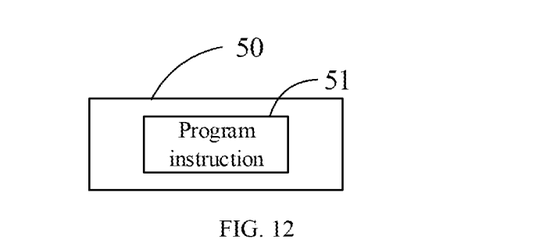
FIG. 12 is a structural schematic view of a storage medium according to an embodiment of the present disclosure.

FIG. 12 is a structural schematic view of a storage medium according to an embodiment of the present disclosure. As shown in FIG. 12, the computer-readable storage medium 50 of the embodiment of the present disclosure stores a program instruction 51. When the program instruction 51 is executed, the method provided in the foregoing embodiments of the present disclosure is implemented. The program instruction 51 may form a program file and be stored in the above-mentioned computer-readable storage medium 50 in the form of a software product, such that a computer device (which may be a personal computer, a server, or a network device, etc.) or a processor may perform all or part of the steps of each implementation method of the present disclosure. The computer-readable storage medium 50 includes: U disk, mobile hard disk, read-only memory (ROM), random access memory (RAM), magnetic disks, optical disks, or other mediums which can store the program code, or a terminal device such as a computer, server, mobile phone, or tablet.

In the several embodiments provided in the present disclosure, it should be understood that the disclosed system, device, and method may be implemented in other ways. For example, the device embodiments described above are merely illustrative. For example, the division of units is only a logical function division, and there may be other divisions in actual implementation. For example, multiple units or components can be combined or integrated to another system, or some features can be ignored, or not implemented. In addition, the displayed or discussed mutual coupling or direct coupling or communication connection may be indirect coupling or communication connection through some interfaces, devices or units, and may be in electrical, mechanical or other forms.

In addition, the functional units in each embodiment of the present disclosure may be integrated into one processing unit, or each unit may exist alone physically, or two or more units may be integrated into one unit. The integrated unit can be implemented in the form of hardware or software functional unit. The above are only implementations of the present disclosure, and do not limit the scope of the present disclosure. Any equivalent structure or equivalent process transformation made using the content of the description and drawings of the present disclosure, or directly or indirectly applied to other related technical fields, shall be included in the scope of the present disclosure.

What is claimed is:

1. An image segmentation method, comprising:
    sending an input image to an image segmentation network;

obtaining a first foreground target box of the input image by the image segmentation network;

obtaining a first region of interest and a first region-of-interest feature map of the input image based on the first foreground target box by the image segmentation network; wherein the first region of interest is a region corresponding to the first foreground target box of the input image;

dividing the first region of interest into a plurality of grids by the image segmentation network, predicting a corresponding feature of each grid in the first region of interest based on the first region-of-interest feature map by the image segmentation network, and obtaining a semantic feature of each pixel in the first region of interest by the image segmentation network; wherein the corresponding feature of each grid is a probability of an existence of a foreground target in the each grid; and obtaining an instance segmentation result based on the corresponding feature of each grid in the first region of interest, information of the first foreground target box, and the semantic feature of each pixel in the first region of interest.

2. The method according to claim 1, wherein the information of the first foreground target box comprises a category of the first foreground target box; the obtaining the instance segmentation result based on the corresponding feature of each grid in the first region of interest, the information of the first foreground target box, and the semantic feature of each pixel in the first region of interest comprises:

determining a region, at which a foreground target exists, in the first region of interest based on the corresponding feature of each grid in the first region of interest, and determining a category of each pixel in the first region of interest based on the semantic feature of each pixel in the first region of interest; wherein the corresponding feature of a grid corresponding to the region at which the foreground target exists is greater than a preset probability threshold; and determining pixels that belong to the category of the first foreground target box in the region at which the foreground target exists and taking the pixels that belong to the category of the first foreground target box in the region at which the foreground target exists as the instance segmentation result, based on the category of each pixel in the first region of interest.

3. The method according to claim 1, wherein the obtaining the first foreground target box of the input image by the image segmentation network, comprises:

obtaining a first basic feature map of the input image by the image segmentation network; and obtaining the first foreground target box of the input image based on the first basic feature map by the image segmentation network.

4. The method according to claim 3, wherein the information of the first foreground target box comprises a location of the first foreground target box; the obtaining the semantic feature of each pixel in the first region of interest by the image segmentation network comprises:

obtaining a corresponding first semantic segmentation feature map of each pixel of the input image by performing semantic segmentation for the first basic feature map by the image segmentation network; and determining a corresponding feature of each pixel in the first region of interest in the first semantic segmentation feature map based on the location of the first foreground target box, and taking the corresponding feature of each pixel in the first region of interest in the first semantic segmentation feature map as the semantic feature of the each pixel in the first region of interest.

5. The method according to claim 3, wherein the obtaining the first foreground target box of the input image based on the first basic feature map by the image segmentation network, comprises:

obtaining a first foreground candidate box of the input image based on the first basic feature map by the image segmentation network;

obtaining a second region-of-interest feature map of the input image based on the first foreground candidate box and the first basic feature map by the image segmentation network; and obtaining the first foreground target box based on the second region-of-interest feature map by the image segmentation network.

6. The method according to claim 5, wherein the obtaining the first foreground target box based on the second region-of-interest feature map by the image segmentation network, comprises:

obtaining a box classification feature map and a box regression feature map corresponding to the second region-of-interest feature map by the image segmentation network; wherein the box classification feature map is configured to indicate probabilities that the first foreground candidate box belongs to each category, and the first box regression feature map is configured to indicate an offset of the first foreground target box relative to the first foreground candidate box; and obtaining the information of the first foreground target box based on the box classification feature map and the box regression feature map corresponding to the second region-of-interest feature map.

7. The method according to claim 6, wherein the information of the first foreground target box comprises a location of the first foreground target box and a category of the first foreground target box; the obtaining the first foreground target box based on the box classification feature map corresponding to the second region-of-interest feature map and the box regression feature map corresponding to the second region-of-interest feature map, comprises:

obtaining the category of the first foreground target box by performing threshold filtering processing for the box classification feature map corresponding to the second region-of-interest feature map; and obtaining the location of the first foreground target box by performing offset transformation for the box regression feature map corresponding to the second region-of-interest feature map and a location of the first foreground candidate box.

8. The method according to claim 1, before the obtaining the information of the first foreground target box of the input image by the image segmentation network, further comprising:

training the image segmentation network.

9. The method according to claim 8, wherein the training the image segmentation method comprises:

sending a training image to the image segmentation network;

obtaining a second basic feature map of the training image by the image segmentation network;

obtaining a second region of interest and a third region-of-interest feature map of the training image based on the second basic feature map by the image segmentation network;

dividing the second region of interest into a plurality of grids by the image segmentation network, predicting a corresponding feature of each grid in the second region of interest based on the second region-of-interest feature map by the image segmentation network, and obtaining a second semantic segmentation feature map by performing semantic segmentation on the second basic feature map by the image segmentation network;

obtaining a first loss of the image segmentation network based on a difference between the corresponding feature of each grid in the second region of interest and a first ground truth, and obtaining a second loss of the image segmentation network based on a difference between the second semantic segmentation feature map and a second ground truth; and adjusting weights of the image segmentation network based on the first loss and the second loss.

10. The method according claim 9, wherein the obtaining the second region of interest and the third region-of-interest feature map in the training image based on the second basic feature map by the image segmentation network, comprises:

obtaining a second foreground candidate box of the training image based on the second basic feature map by the image segmentation network, and taking a region corresponding to the second foreground candidate box in the training image as the second region of interest; and obtaining the third region-of-interest feature map based on the second foreground candidate box and the second basic feature map by the image segmentation network.

11. The method according to claim 10, after the obtaining the third region-of-interest feature map based on the second foreground candidate box and the second basic feature map by the image segmentation network, further comprising:

obtaining a box classification feature map and a box regression feature map corresponding to the third region-of-interest feature map by the image segmentation network; wherein the box classification feature map corresponding to the third region-of-interest feature map is configured to represent probabilities that the second foreground candidate box belongs to each category, and the box regression feature map corresponding to the third region-of-interest feature map is configured to represent an offset of a second foreground target box relative to the second foreground candidate box;

obtaining a third loss of the image segmentation network based on a difference between the box classification feature map corresponding to the third region-of-interest feature map and a third ground truth, and obtaining a fourth loss of the image segmentation network based on a difference between the box regression feature map corresponding to the third region-of-interest feature map and a fourth ground truth; and adjusting the weights of the image segmentation network based on the third loss and the fourth loss.

12. A training method for an image segmentation network, comprising:

sending a training image to the image segmentation network;

obtaining a second basic feature map of the training image by the image segmentation network;

obtaining a second region of interest and a third region-of-interest feature map in the training image based on the second basic feature map by the image segmentation network;

dividing the second region of interest into a plurality of grids by the image segmentation network, predicting a corresponding feature of each grid in the second region of interest based on the second region-of-interest feature map by the image segmentation network, and obtaining a second semantic segmentation feature map by performing semantic segmentation for the second basic feature map by the image segmentation network;

obtaining a first loss of the image segmentation network based on a difference between the corresponding feature of each grid in the second region of interest and a first ground truth, and obtaining a second loss of the image segmentation network based on a difference between the second semantic segmentation feature map and a second ground truth; and adjusting weights of the image segmentation network based on the first loss and the second loss.

13. The method according to claim 12, wherein the obtaining the second region of interest and the third region-of-interest feature map in the training image based on the second basic feature map by the image segmentation network comprises:

obtaining a second foreground candidate box of the training image based on the second basic feature map by the image segmentation network, and taking a region corresponding to the second foreground candidate box in the training image as the second region of interest; and obtaining the third region-of-interest feature map based on the second foreground candidate box and the second basic feature map by the image segmentation network.

14. The method according to claim 13, after the obtaining the third region-of-interest feature map based on the second foreground candidate box and the second basic feature map by the image segmentation network, further comprising:

obtaining a box classification feature map and a box regression feature map corresponding to the third region-of-interest feature map by the image segmentation network; wherein the box classification feature map corresponding to the third region-of-interest feature map is configured to represent a probabilities that the second foreground candidate box belongs to each category, and the box regression feature map corresponding to the third region-of-interest feature map is configured to represent an offset of a second foreground target box relative to the second foreground candidate box;

obtaining a third loss of the image segmentation network based on a difference between the box classification feature map corresponding to the third region-of-interest feature map and a third ground truth, and obtaining a fourth loss of the image segmentation network based on a difference between the box regression feature map corresponding to the third region-of-interest feature map and a fourth ground truth; and adjusting the weights of the image segmentation network based on the third loss and the fourth loss.

15. An electronic device, comprising a processor and a memory connected to the processor;

wherein the memory stores a program instruction; the processor is configured to execute the program instruction stored in the memory to perform:

sending an input image to an image segmentation network;

obtaining a first foreground target box of the input image by the image segmentation network;

obtaining a first region of interest and a first region-of-interest feature map of the input image based on the first foreground target box by the image segmentation network; wherein the first region of interest is a region corresponding to the first foreground target box of the input image;

dividing the first region of interest into a plurality of grids by the image segmentation network, predicting a corresponding feature of each grid in the first region of interest based on the first region-of-interest feature map by the image segmentation network, and obtaining a semantic feature of each pixel in the first region of interest by the image segmentation network; wherein the corresponding feature of each grid is a probability of an existence of a foreground target in the each grid; and obtaining an instance segmentation result based on the corresponding feature of each grid in the first region of interest, information of the first foreground target box, and the semantic feature of each pixel in the first region of interest.

16. The electronic device according to claim 15, wherein the information of the first foreground target box comprises a category of the first foreground target box; the obtaining the instance segmentation result based on the corresponding feature of each grid in the first region of interest, the information of the first foreground target box, and the semantic feature of each pixel in the first region of interest comprises:

determining a region, at which a foreground target exists, in the first region of interest based on the corresponding feature of each grid in the first region of interest, and determining a category of each pixel in the first region of interest based on the semantic feature of each pixel in the first region of interest; wherein the corresponding feature of a grid corresponding to the region at which the foreground target exists is greater than a preset probability threshold; and determining pixels that belong to the category of the first foreground target box in the region at which the foreground target exists and taking the pixels that belong to the category of the first foreground target box in the region at which the foreground target exists as the instance segmentation result, based on the category of each pixel in the first region of interest.

17. The electronic device according to claim 15, wherein the obtaining the first foreground target box of the input image by the image segmentation network, comprises:

obtaining a first basic feature map of the input image by the image segmentation network; and obtaining the first foreground target box of the input image based on the first basic feature map by the image segmentation network.

18. The electronic device according to claim 15, wherein the processor is configured to execute the program instruction stored in the memory to further perform:

before the obtaining the information of the first foreground target box of the input image by the image segmentation network, training the image segmentation network.

19. The electronic device according to claim 18, wherein the training the image segmentation method comprises:

sending a training image to the image segmentation network;

obtaining a second basic feature map of the training image by the image segmentation network;

obtaining a second region of interest and a third region-of-interest feature map of the training image based on the second basic feature map by the image segmentation network;

dividing the second region of interest into a plurality of grids by the image segmentation network, predicting a corresponding feature of each grid in the second region of interest based on the second region-of-interest feature map by the image segmentation network, and obtaining a second semantic segmentation feature map by performing semantic segmentation on the second basic feature map by the image segmentation network;

obtaining a first loss of the image segmentation network based on a difference between the corresponding feature of each grid in the second region of interest and a first ground truth, and obtaining a second loss of the image segmentation network based on a difference between the second semantic segmentation feature map and a second ground truth; and adjusting weights of the image segmentation network based on the first loss and the second loss.

20. The electronic device according to claim 19, wherein the obtaining the second region of interest and the third region-of-interest feature map in the training image based on the second basic feature map by the image segmentation network, comprises:

obtaining a second foreground candidate box of the training image based on the second basic feature map by the image segmentation network, and taking a region corresponding to the second foreground candidate box in the training image as the second region of interest; and obtaining the third region-of-interest feature map based on the second foreground candidate box and the second basic feature map by the image segmentation network.

* * * * *